United States Patent
Caulfield et al.

(10) Patent No.: US 10,820,066 B2
(45) Date of Patent: Oct. 27, 2020

(54) RECONCILING ABR SEGMENTS ACROSS REDUNDANT SITES

(71) Applicant: Cisco Technology, Inc., San Jose, CA (US)

(72) Inventors: Matthew Francis Caulfield, Harvard, MA (US); Michael Anthony Napolitano, Jr., Acton, MA (US)

(73) Assignee: Cisco Technology, Inc., San Jose, CA (US)

(*) Notice: Subject to any disclaimer, the term of this patent is extended or adjusted under 35 U.S.C. 154(b) by 76 days.

(21) Appl. No.: 16/013,346

(22) Filed: Jun. 20, 2018

(65) Prior Publication Data

US 2019/0394538 A1   Dec. 26, 2019

(51) Int. Cl.
*H04N 21/845*   (2011.01)
*H04L 29/06*   (2006.01)

(52) U.S. Cl.
CPC ..... *H04N 21/8456* (2013.01); *H04L 65/4084* (2013.01); *H04L 65/601* (2013.01); *H04L 65/607* (2013.01); *H04L 65/80* (2013.01)

(58) Field of Classification Search
CPC ...................................................... H04L 67/06
See application file for complete search history.

(56) References Cited

U.S. PATENT DOCUMENTS

| | | |
|---|---|---|
| 7,139,999 B2 | 11/2006 | Bowman-Amuah |
| 8,639,971 B1 | 1/2014 | White |
| 9,100,700 B2 | 8/2015 | Major |
| 9,432,704 B2 | 8/2016 | Mutton |
| 9,467,708 B2 | 10/2016 | Soroushian |
| 9,706,509 B2 | 7/2017 | Beheydt et al. |
| 2004/0172478 A1 | 9/2004 | Jacobs |
| 2005/0246612 A1 | 11/2005 | Leis |
| 2007/0033154 A1 | 2/2007 | Trainum |
| 2007/0050336 A1 | 3/2007 | Bugir |
| 2007/0180528 A1 | 8/2007 | Kane |
| 2008/0086773 A1 | 4/2008 | Tuvell |
| 2008/0155390 A1 | 6/2008 | Karim |
| 2008/0273504 A1 | 11/2008 | Foley |

(Continued)

OTHER PUBLICATIONS

Notice of Allowance dated May 10, 2019 cited in U.S. Appl. No. 14/213,156, 14 pgs.

(Continued)

*Primary Examiner* — Yves Dalencourt
(74) *Attorney, Agent, or Firm* — Merchant & Gould P.C.

(57) ABSTRACT

Reconciling Adaptive Bitrate (ABR) segments across redundant sites may be provided. First, a working manifest may be set to match a primary downstream manifest and the working manifest may be updated using an auxiliary downstream manifest. Next, first segments missing from the working manifest as identified during updating the working manifest using the auxiliary downstream manifest may be copied from the auxiliary downstream manifest to the primary downstream manifest. The working manifest may then be updated using a primary upstream manifest. And then second segments missing from the working manifest as identified during updating the working manifest using the primary upstream manifest may be copied from the primary upstream manifest to the primary downstream manifest.

17 Claims, 3 Drawing Sheets

(56) References Cited

U.S. PATENT DOCUMENTS

| | | |
|---|---|---|
| 2009/0119499 A1 | 5/2009 | Cao |
| 2010/0146040 A1 | 6/2010 | Ramakrishnan et al. |
| 2010/0191539 A1 | 7/2010 | Loughery, III |
| 2010/0218033 A1 | 8/2010 | Safar et al. |
| 2011/0009991 A1 | 1/2011 | Dinicola |
| 2011/0050990 A1 | 3/2011 | Farkash |
| 2011/0083037 A1 | 4/2011 | Bockarov et al. |
| 2011/0225417 A1 | 9/2011 | Maharajh |
| 2011/0235703 A1 | 9/2011 | Labrozzi et al. |
| 2011/0252233 A1 | 10/2011 | De Atley |
| 2011/0314130 A1 | 12/2011 | Strasman |
| 2012/0011270 A1 | 1/2012 | Priddle et al. |
| 2012/0023251 A1 | 1/2012 | Pyle et al. |
| 2012/0117225 A1 | 2/2012 | Kordasiewicz et al. |
| 2012/0128061 A1 | 5/2012 | Labrozzi et al. |
| 2012/0159098 A1 | 6/2012 | Cheung |
| 2012/0265856 A1 | 10/2012 | Major et al. |
| 2013/0227573 A1 | 8/2013 | Morsi et al. |
| 2013/0232289 A1 | 9/2013 | Zhong |
| 2013/0315567 A1 | 11/2013 | Narayanan et al. |
| 2014/0006854 A1 | 1/2014 | Bello |
| 2014/0006951 A1 | 1/2014 | Hunter |
| 2014/0013349 A1 | 1/2014 | Millar et al. |
| 2014/0019587 A1 | 1/2014 | Giladi |
| 2014/0025710 A1 | 1/2014 | Sarto |
| 2014/0059243 A1 | 2/2014 | Reisner |
| 2014/0079207 A1 | 3/2014 | Zhakov |
| 2014/0140417 A1 | 5/2014 | Shaffer et al. |
| 2015/0040169 A1 | 2/2015 | Hoffert |
| 2015/0256617 A1* | 9/2015 | Klose ............... G06F 16/119 709/217 |
| 2016/0316235 A1 | 10/2016 | Van Veldhuisen |
| 2017/0055012 A1* | 2/2017 | Phillips ................ H04L 67/06 |

OTHER PUBLICATIONS

Chinese Second Office Action issued in Application No. 201580013828.3 dated Feb. 24, 2019, 8 pp.

Dr. Gorry Fairhurst, "MPEG-2 Transmission," Jan. 2001, 7 pages; http://www.erg.abdn.ac.uk/future-net/digital-video/mpeg2-trans.html (9 pgs).

Wikipedia, the free encyclopedia, "MPEG transport stream," Wikipedia, Feb. 26, 2013, 7 pages; http://en.wikipedia.org/wiki/MPEG_transport_stream.

Cable Television Laboratories, Inc., OpenCable tm Specifications, OC-SP-EBP=101-130118, Jan. 18, 2013 (31 pgs).

Wikipedia, the free encyclopedia, Presentation time stamp, Wikipedia, May 27, 2012, 1 page; http://en.wikipedia.org/wiki/Presentation_time-stamp (1 pg.).

Office Action dated Oct. 5, 2018 cited in U.S. Appl. No. 14/213,156, 38 pgs.

U.S. Office Action dated Mar. 23, 2020 cited in U.S. Appl. No. 15/823,884, 33 pgs.

* cited by examiner

RECONCILING ABR SEGMENTS ACROSS REDUNDANT SITES

TECHNICAL FIELD

The present disclosure relates generally to synchronizing segments.

BACKGROUND

Adaptive bitrate (ABR) streaming is a method of video streaming over Hypertext Transfer Protocol (HTTP) where the source content is encoded at multiple bit rates, then each of the different bit rate streams are segmented into small multi-second parts. The streaming client is made aware of the available streams at differing bit rates, and segments of the streams by a manifest file. When starting, the client typically requests the segments from the lowest bit rate stream. If the client finds the download speed is greater than the bit rate of the segment downloaded, then it may request the next higher bit rate segments. Later, if the client finds the download speed for a segment is lower than the bit rate for the segment, and therefore the network throughput has deteriorated, then it may request a lower bit rate segment. The segment size can vary depending on the particular implementation, but they are typically between two and ten seconds.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
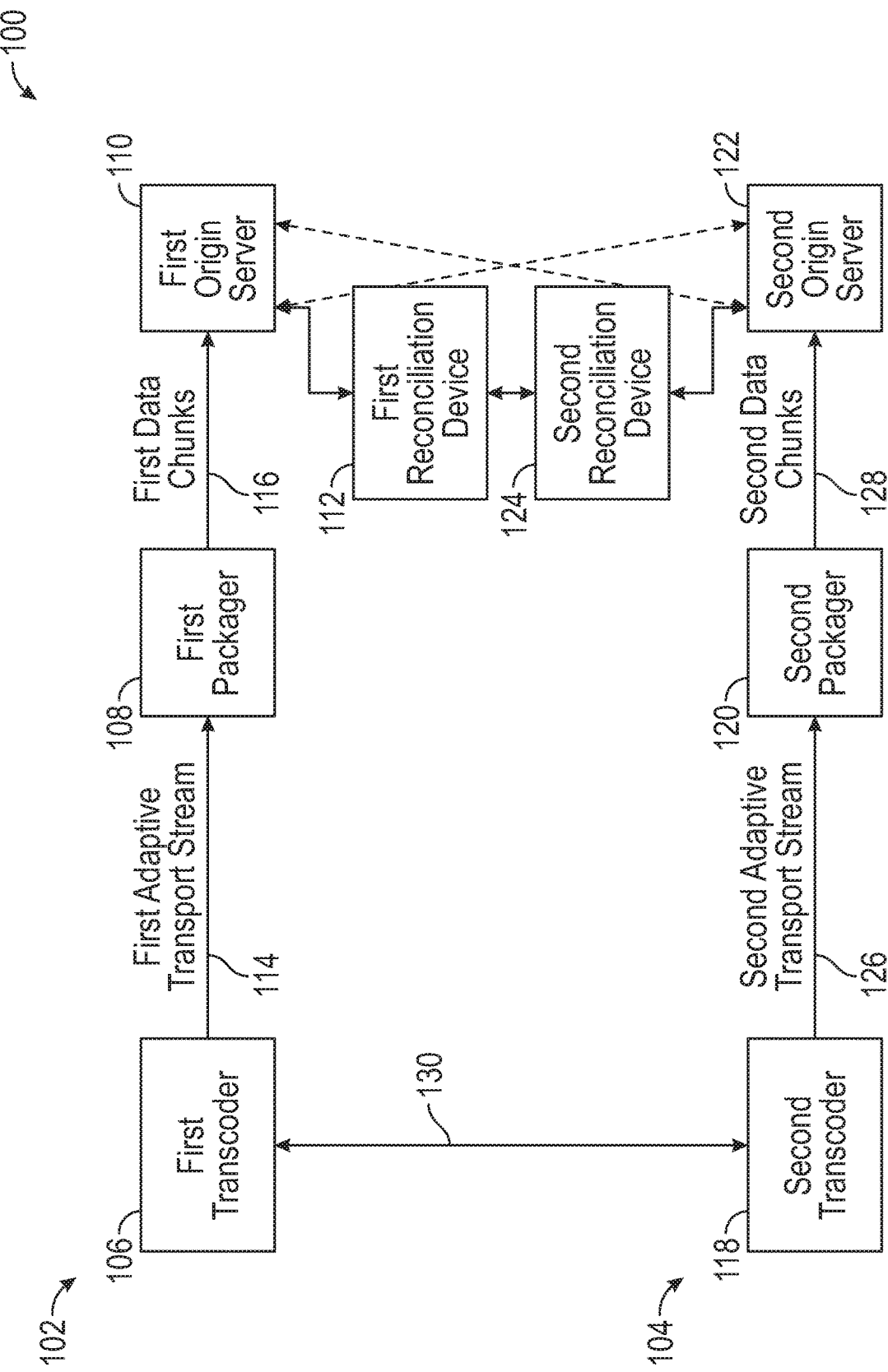
FIG. 1 is a block diagram of a system for reconciling Adaptive Bitrate (ABR) segments across redundant sites.

Reconciling Adaptive Bitrate (ABR) segments across redundant sites may be provided. First, a working manifest may be set to match a primary downstream manifest and the working manifest may be updated using an auxiliary downstream manifest. Next, first segments missing from the working manifest as identified during updating the working manifest using the auxiliary downstream manifest may be copied from the auxiliary downstream to the primary downstream. The working manifest may then be updated using a primary upstream manifest. And then second segments missing from the working manifest as identified during updating the working manifest using the primary upstream manifest may be copied from the primary upstream to the primary downstream.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Video distribution for live events, such as sports and news, may require a high level of service reliability. One process for achieving such reliability may comprise redundancy. In an ABR video architecture, components such as encoders, transcoders, packagers, origin servers, just-in-time packagers, and caches may run in redundant parallel pipelines. Without synchronization between these parallel pipelines, failover may interrupt service. To achieve seamless failover, however, both redundant pipelines should produce functionally equivalent and interchangeable content.

For ABR packagers, which convert a transport stream (e.g., MPEG2-TS) into ABR (e.g. HLS or DASH), equivalent content may comprise ABR segments with the same name containing the same video (and audio) content. Although ABR transcoders may insert Encoder Boundary Points (EBPs) to indicate segments boundaries with equivalent Presentation Timestamp (PTS) and Coordinated Universal Time (UTC) times embedded, there may not be enough information in the input to the ABR packager to deterministically generate equivalently named segments across redundant sites. This issue may stem from two factors: i) splice points; and ii) input loss.

Regarding splice points, program boundaries may not naturally occur at the same boundaries as ABR segments. For example, although an ABR segment length may be configured to regularly occur every six seconds, a splice point might occur three seconds into the segment. As a result, the ABR segment may be broken into an unpredictable size. Regarding input loss, components of a video pipeline or network elements connecting those components may fail or become congested. These common failure scenarios may cause input loss to an ABR packager. Input loss may prevent deterministic segment naming across redundant pipelines.

Equivalent segment naming may be one part of producing functionally equivalent content. Another part may comprise equivalent history. Time shift use cases, which may allow a user to pause or rewind live television, may use a time shift buffer. The time shift buffer may be a history of past segments produced by the video pipeline. In case of a failover, not only should segments across redundant pipelines have the same names, but the history of available content should also be equivalent to support time shifting. Maintaining a complete history may not be possible in the case of input loss, in which one redundant pipeline loses video data before the ABR packaging stage.

ABR video and audio may be packaged in small media files (e.g., chunks) that may have a fixed duration (e.g., 2 s). Each ABR chunk may be fully decodable on its own (i.e., it may not need previous chunks for decoding). Audio and video that may be contained in an ABR chunk may be aligned (i.e., a first audio sample in the chunk may correspond to a first video sample in the chunk).

With ABR, a single video/audio source may be encoded in multiple representations that may have different resolutions, framerates, and/or bitrates. Each of these representations may be separated into individually decodable chunks. Moreover, the chunk boundaries may be aligned (i.e., the corresponding chunks of the individual representations may start with the same video frame/audio sample). Aligning the chunk boundaries may allow an ABR client (e.g., on a client device) to seamlessly switch between the available representations at the chunk boundaries. This may allow the ABR client to switch to an appropriate representation based on the network bandwidth it has available at a certain moment in time. When the ABR client has a higher network bandwidth available, it may switch to a representation that may have a higher video resolution, framerate, and bitrate. When the available bandwidth is lower, the ABR client may switch to a representation with a lower video resolution, framerate, and bitrate.

FIG. 1 is a block diagram of system 100 for reconciling Adaptive Bitrate (ABR) segments across redundant sites. As shown in FIG. 1, system 100 may comprise a first ABR pipeline 102 and a second ABR pipeline 104. First ABR pipeline 102 may be located at a first site (e.g., in a first data center) and may serve a first geographic area. First ABR pipeline 102 may comprise a first transcoder 106, a first packager 108, a first origin server 110, and a first reconciliation device 112. First transcoder 106 may receive a first source and encode it into a first adaptive transport stream 114. First packager 108 may receive first adaptive transport stream 114 and package it by cutting it into first data chunks 116. First origin server 110 may deliver first data chunks 116 to a first client device over a first Content Deliver Network (CDN). The first client device may decode first data chunks 116 and render them for user consumption or may record them.

Second ABR pipeline 104 may be located at a second site (e.g., in a second data center) and may serve a second geographic area. Second ABR pipeline 102 may comprise a second transcoder 118, a second packager 120, a second origin server 122, and a second reconciliation device 124. Second transcoder 118 may receive a second source and encode it into a second adaptive transport stream 126. The first source and the second source may comprise the same content. Second packager 120 may receive second adaptive transport stream 126 and package it by cutting it into second data chunks 128. Second origin server 122 may deliver second data chunks 128 to a second client device over a second CDN. The second client device may decode second data chunks 128 and render them for user consumption or may record them.

First transcoder 106, first packager 108, first origin server 110, first reconciliation device 112, second transcoder 118, second packager 120, second origin server 122, and second reconciliation device 124 may be embodied by a computing device 300 described in greater detail below with respect to FIG. 3. Notwithstanding, first transcoder 106, first packager 108, first origin server 110, first reconciliation device 112, second transcoder 118, second packager 120, second origin server 122, and second reconciliation device 124 may be embodied in hardware and/or in software (including firmware, resident software, micro-code, etc.). First client device or second client device may comprise, but are not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device. First CDN or second CDN may comprise a collection of web servers and network components for example.

First transcoder 106 and second transcoder 118 may place their video chunk boundaries on the same video frames and their audio chunk boundaries on the same audio samples (i.e., the ABR profiles of the ABR transcoders may be "aligned"). This chunk boundary alignment may be coordinated between first transcoder 106 and second transcoder 118 via inter-node communications 130. One process for providing the aforementioned alignment is described in U.S. Pat. No. 9,706,509, which is incorporated herein by reference in its entirety. The placement of the aforementioned boundaries may be based upon timestamps present in the input (i.e., the source).

Consistent with embodiments of the disclosure, first reconciliation device 112 and second reconciliation device 124 may use a common UTC timeline as a reference point to synchronize ABR segment timestamps and segment numbers across multiple sites (e.g., the first site and the second site). For example, first reconciliation device 112 may copy segments from the second site when failures occur in the first site. A synchronization protocol may keep first reconciliation device 112 and second reconciliation device 124 from drifting too far, for example, in double failure scenarios. As a result, embodiments of the disclosure may provide, for example, identical content in redundant sites and a seamless failover experience.

First ABR pipeline 102 and second ABR pipeline 104 may comprise two redundant ABR video pipelines, each of which may include a transcoder, packager, and origin server. First transcoder 106 and second transcoder 118 may each produce an Adaptive Transport Stream (e.g., first adaptive transport stream 114 and second adaptive transport stream 126 respectively) with embedded Encoder Boundary Points (EBPs) that may include an embedded Coordinated Universal Time (UTC). First transcoder 106 and second transcoder 118 may be synchronized via a synchronization protocol (e.g., via inter-node communications 130) and may produce adaptive transport streams with the same EBPs (including the embedded UTC). The UTC embedded in the EBP may be the same across the first site and the second site within a configurable tolerance (e.g. 300 ms). The packagers (e.g., first packager 108 and second packager 120) may not be synchronized other than being configured to produce the same ABR output format. First reconciliation device 112 and second reconciliation device 124 may allow first ABR pipeline 102 and second ABR pipeline 104 to produce segments with matching names and, during failure conditions such as input loss, fill holes in their time shift buffer histories for example.

Figure 2:
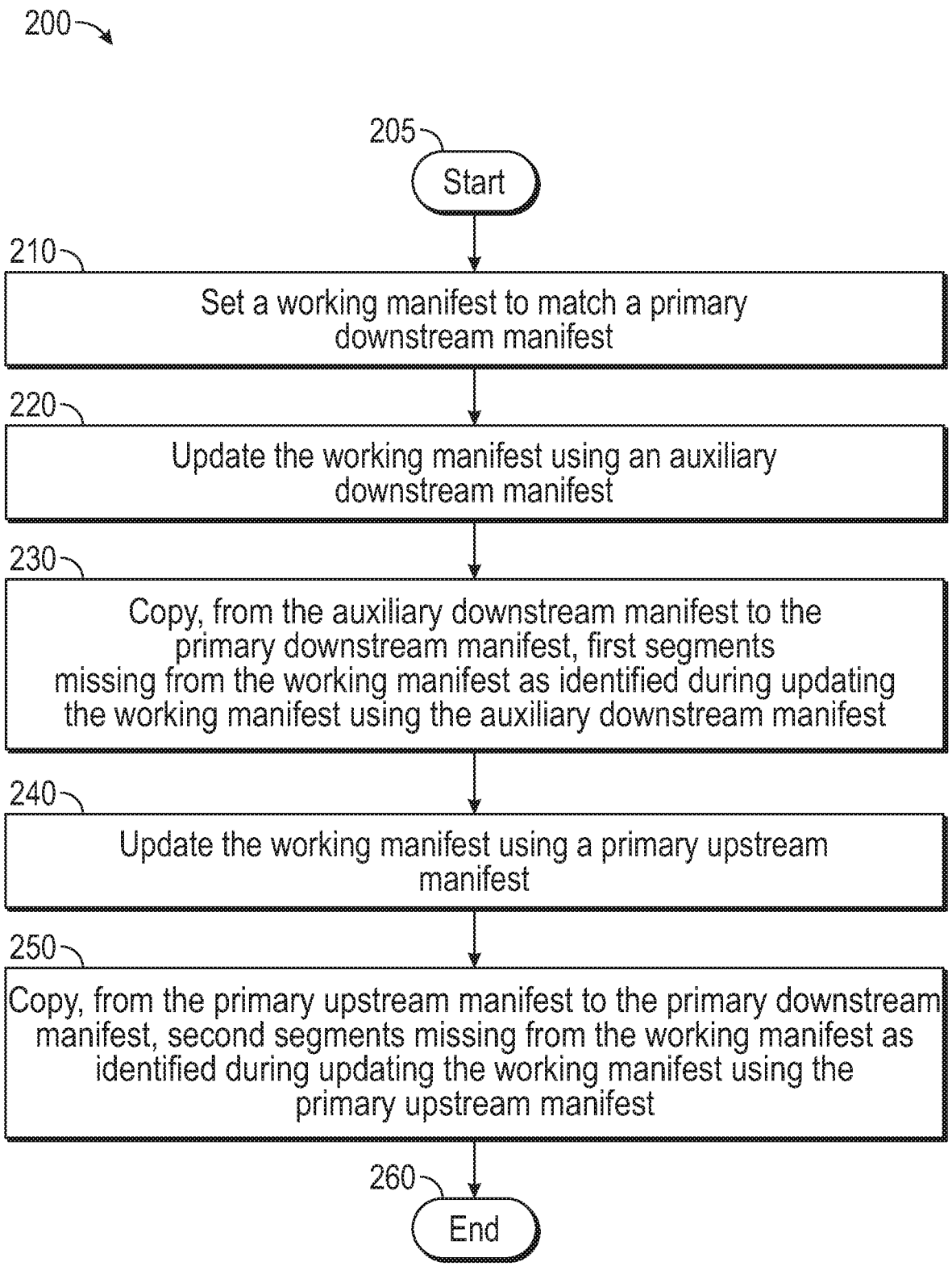
FIG. 2 is a flow chart of a method for reconciling Adaptive Bitrate (ABR) segments across redundant sites.

FIG. 2 is a flow chart setting forth the general stages involved in a method 200 consistent with an embodiment of the disclosure for reconciling Adaptive Bitrate (ABR) segments across redundant sites. Method 200 may be implemented using a first reconciliation device 112 as described in more detail below with respect to FIG. 1. Ways to implement the stages of method 200 will be described in greater detail below.

Method 200 may begin at starting block 205 and proceed to stage 210 where first reconciliation device 112 may set a working manifest to match a primary downstream manifest. For example, first reconciliation device 112 and second reconciliation device 122 may be configured per Table 1 below:

TABLE 1

| | |
|---|---|
| Primary Upstream URL | The location where first packager 108, in the first site with first reconciliation device 112, should publish its manifest and segments. |
| Auxiliary Upstream URL | The location where second packager 120, in the second site with second reconciliation device 124, should publish its manifest and segments. |
| Primary Downstream URL | The location where first reconciliation device 112 should publish its reconciled manifest and segments. |
| Auxiliary Downstream URL | The location where second reconciliation device 124 should publish its reconciled manifest and segments. |

On start-up, first reconciliation device 112 may fetch manifests from the configured upstream and downstream URLs. Then first reconciliation device 112 may sets its working manifest to match the manifest fetched from the primary downstream URL (i.e., the last manifest published by first reconciliation device 112 if running previously e.g. if first reconciliation device 112 failed and restarted).

From stage 210, where first reconciliation device 112 sets the working manifest to match the primary downstream manifest, method 200 may advance to stage 220 where first reconciliation device 112 may update the working manifest using an auxiliary downstream manifest. For example, first reconciliation device 112 may update the working manifest using the manifest from the auxiliary downstream URL. The update process may take as input an old manifest (e.g., the working manifest) and a new manifest (e.g., the auxiliary downstream manifest). An objective of the update process may be to reconcile new information with the old information. Because no assumption may be made regarding the stream timestamps or the segment numbers, the update process may rely on UTC timestamps embedded in the manifest (e.g., that may be populated based on EBP UTC values by the packager) to correlate segments across different manifests.

The update process may iterate in reverse order (e.g., from most recent to least recent) across both the old and the new manifests searching for a matching pair of UTC segment times. If a match is found, then the corresponding stream timestamps and segment numbers may be used to calculate a timestamp offset and a segment number offset (i.e., offset=old seg timestamp−new seg timestamp). The timestamp offset may be used to translate between the segment timeline in the new manifest and the old manifest. Using this offset, new segments in the new manifest may be detected and added to a list of "segments-to-be-copied". These segments may also be added to the old manifest (e.g., the working manifest).

Should the update process fail to run for all possible upstream URLs, then the update process may also be rerun in a "forced" mode. For example, rather than attempting to find any correlation between segments in the two manifests, the correlation may take a brute force approach. For example, any segments in the new manifest with UTC times after the UTC time of the last segment in the old manifest may be copied. The stream timestamps of these segments may be made contiguous with the old manifest (e.g., the working manifest) timeline.

Once first reconciliation device 112 updates the working manifest using the auxiliary downstream manifest in stage 220, method 200 may continue to stage 230 where first reconciliation device 112 may copy, from the auxiliary downstream manifest to the primary downstream manifest, first segments missing from the working manifest as identified during updating the working manifest using the auxiliary downstream manifest.

After first reconciliation device 112 copies, from the auxiliary downstream manifest to the primary downstream manifest, the first segments missing from the working manifest as identified during updating the working manifest using the auxiliary downstream manifest in stage 230, method 200 may proceed to stage 240 where first reconciliation device 112 may update the working manifest using a primary upstream manifest. For example, after start-up stages (e.g., stages 210, 220, and 230), the origin content in the first site should match the origin content of the second site. This synchronization may ensure equivalent history initially. After the start-up (e.g., stages 210, 220, and 230), first reconciliation device 112 may enter a main polling loop. For example, first reconciliation device 112 may repeat stages 240 and 250 every predetermined polling interval. The updating process performed in stage 240 may be similar to the updating process performed in stage 220, however, the new manifest may comprise the primary upstream manifest in stage 240 rather than the auxiliary downstream manifest of stage 220.

From stage 240, where first reconciliation device 112 updates the working manifest using the primary upstream manifest, method 200 may advance to stage 250 where first reconciliation device 112 may copy, from the primary upstream manifest to the primary downstream manifest, second segments missing from the working manifest as identified during updating the working manifest using the primary upstream manifest. If any of these stages fail, first reconciliation device 112 may attempt to redo the above stages with auxiliary upstream URLs respectively corresponding to other sites besides the second site until one succeeds. Accordingly, the failure of any packager (upstream) may not impact the time shift buffer history. Each reconciliation device may pull manifests and segments from an auxiliary site should one packager fail. Once first reconciliation device 112 copies, from the primary upstream manifest to the primary downstream manifest, the second segments missing from the working manifest as identified during updating the working manifest using the primary upstream manifest in stage 250, method 200 may then end at stage 260.

Furthermore should both first ABR pipeline 102 and second ABR pipeline 104 experience input loss simultaneously, the reconciliation process may drop out of synchronization. To prevent any long term impact from unsynchronized pipelines, the reconciliation devices also expose a Hypertext Transfer Protocol (HTTP) endpoint "/sync" that may serve a list of the most recent correlation results. Each result may include a UTC time, a stream timestamp, and a segment number. The reconciliation devices in other sites may periodically query this endpoint to check their own correlation results against the remote reconciliation device. If any result does not match, then the reconciliation device that is further behind in stream timestamp may forcibly update its working manifest to align with the sync information of the other site.

Figure 3:
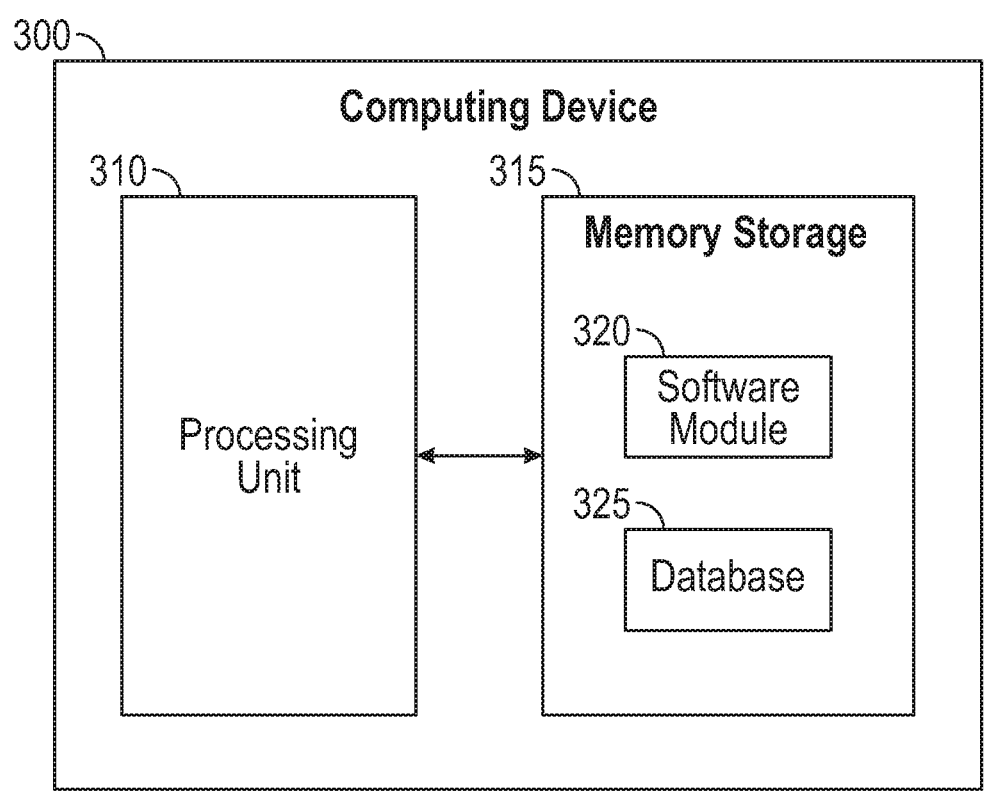
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform processes for reconciling Adaptive Bitrate (ABR) segments across redundant sites, including for example, any one or more of the stages from method 200 described above with respect to FIG. 2 Computing device 300 may provide an operating environment for any one or more of first transcoder 106, first packager 108, first origin server 110, first reconciliation device 112, second transcoder 118, second packager 120, second origin server 122, and second reconciliation device 124. First transcoder 106, first packager 108, first origin server 110, first reconciliation device 112, second transcoder 118, second packager 120, second origin server 122, and second reconciliation device 124 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, an encoder, a transcoder, a camera, a load balancer or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   setting, by a first reconciliation device, a working manifest to match a primary downstream manifest, wherein the primary downstream manifest is published by a first packager at a first site:
   updating the working manifest using an auxiliary downstream manifest, wherein the auxiliary downstream manifest is published by a second packager at a second site;
   copying, from the auxiliary downstream manifest to the primary downstream manifest, first segments missing from the working manifest as identified during updating the working manifest using the auxiliary downstream manifest; and
   wherein updating the working manifest using the auxiliary downstream manifest comprises:
   determining a first timestamp match between the working manifest and the auxiliary downstream manifest;
   determining a first timestamp offset based on the first timestamp match; and
   identifying, based on the first timestamp offset, the first segments.

2. The method of claim 1, further comprising:
   updating, by the first reconciliation device, the working manifest using a primary upstream manifest; and
   copying, from the primary upstream manifest to the primary downstream manifest, second segments missing from the working manifest as identified during updating the working manifest using the primary upstream manifest.

3. The method of claim 2, wherein updating the working manifest using the primary upstream manifest comprises:
   determining a second timestamp match between the working manifest and the primary upstream manifest;
   determining a second timestamp offset based on the first timestamp match; and
   identifying, based on the second timestamp offset, the second segments.

4. The method of claim 2, wherein the following stages are repeated at a predetermined polling interval:
   updating the working manifest using the primary upstream manifest; and
   copying, from the primary upstream manifest to the primary downstream manifest, segments missing from the working manifest as identified during updating the working manifest using the primary upstream manifest.

5. The method of claim 2, wherein updating the working manifest using the auxiliary downstream manifest comprises updating the working manifest using the auxiliary downstream manifest corresponding to a second reconciliation device.

6. The method of claim 1, further comprising providing content associated with the primary downstream manifest to a client device.

7. A non-transitory computer-readable medium that stores a set of instructions which when executed perform a method comprising:
   setting, by a first reconciliation device, a working manifest to match a primary downstream manifest, wherein the primary downstream manifest is published by a first packager at a first site:
   updating the working manifest using an auxiliary downstream manifest, wherein the auxiliary downstream manifest is published by a second packager at a second site;
   copying, from the auxiliary downstream manifest to the primary downstream manifest, first segments missing from the working manifest as identified during updating the working manifest using the auxiliary downstream manifest; and
   wherein updating the working manifest using the auxiliary downstream manifest comprises:
   determining a first timestamp match between the working manifest and the auxiliary downstream manifest;
   determining a first timestamp offset based on the first timestamp match; and
   identifying, based on the first timestamp offset, the first segments.

8. The non-transitory computer-readable medium of claim 7, further comprising:
   updating, by the first reconciliation device, the working manifest using a primary upstream manifest; and
   copying, from the primary upstream manifest to the primary downstream manifest, second segments missing from the working manifest as identified during updating the working manifest using the primary upstream manifest.

9. The non-transitory computer-readable medium of claim 8, wherein
   updating the working manifest using the primary upstream manifest comprises:
   determining a second timestamp match between the working manifest and the primary upstream manifest;
   determining a second timestamp offset based on the first timestamp match; and
   identifying, based on the second timestamp offset, the second segments.

10. The non-transitory computer-readable medium of claim 8, wherein the following stages are repeated at a predetermined polling interval:
    updating the working manifest using the primary upstream manifest; and copying, from the primary upstream manifest to the primary downstream manifest, segments missing from the working manifest as identified during updating the working manifest using the primary upstream manifest.

11. The non-transitory computer-readable medium of claim 8, wherein updating the working manifest using the auxiliary downstream manifest comprises updating the working manifest using the auxiliary downstream manifest corresponding to a second reconciliation device.

12. The non-transitory computer-readable medium of claim 7, further comprising providing content associated with the primary downstream manifest to a client device.

13. A system comprising:
    a memory storage; and
    a processing unit disposed in a first reconciliation device coupled to the memory storage, wherein the processing unit is operative to:
    set a working manifest to match a primary downstream manifest, wherein the primary downstream manifest is published by a first packager at a first site;
    update the working manifest using an auxiliary downstream manifest wherein the auxiliary downstream manifest is published by a second packager at a second site;

copy, from the auxiliary downstream manifest to the primary downstream manifest, first segments missing from the working manifest as identified during updating the working manifest using the auxiliary downstream manifest; and wherein the processing unit being operative to update the working manifest using the auxiliary downstream manifest comprises the processing unit being operative to:

determine a first timestamp match between the working manifest and the auxiliary downstream manifest;

determine a first timestamp offset based on the first timestamp match; and identify, based on the first timestamp offset, the first segments.

14. The system of claim 13, wherein the processing unit is further operative to:

update the working manifest using a primary upstream manifest; and copy, from the primary upstream manifest to the primary downstream manifest, second segments missing from the working manifest as identified during updating the working manifest using the primary upstream manifest.

15. The system of claim 14, wherein the processing unit being operative to update the working manifest using the primary upstream manifest comprises the processing unit being operative to:

determine a second timestamp match between the working manifest and the primary upstream manifest;

determine a second timestamp offset based on the first timestamp match; and identify, based on the second timestamp offset, the second segments.

16. The system of claim 14, wherein the processing unit is operative to repeat at a predetermined polling interval:

update the working manifest using the primary upstream manifest; and copy, from the primary upstream manifest to the primary downstream manifest, segments missing from the working manifest as identified during updating the working manifest using the primary upstream manifest.

17. The system of claim 14, wherein the auxiliary downstream manifest corresponds to a second reconciliation device.

* * * * *